(12) United States Patent
Saposnik

(10) Patent No.: US 7,762,360 B2
(45) Date of Patent: Jul. 27, 2010

(54) VEHICLE CALIBRATION AND TRAJECTORY CONTROL SYSTEM

(75) Inventor: Fabio Saposnik, 35 Empress Avenue, Suite PH205 (2305), Toronto, Ontario (CA) M2N 6T3

(73) Assignee: Fabio Saposnik, Markham (CA)

( * ) Notice: Subject to any disclaimer, the term of this patent is extended or adjusted under 35 U.S.C. 154(b) by 828 days.

(21) Appl. No.: 11/676,758

(22) Filed: Feb. 20, 2007

(65) Prior Publication Data

US 2007/0225891 A1    Sep. 27, 2007

Related U.S. Application Data

(60) Provisional application No. 60/774,601, filed on Feb. 21, 2006.

(51) Int. Cl.
*B62D 6/00* (2006.01)
*B62D 11/00* (2006.01)
*B62D 11/02* (2006.01)

(52) U.S. Cl. ............... 180/6.2; 180/6.24; 180/6.26; 180/6.28; 180/6.3; 180/6.32; 180/6.36; 180/6.38; 180/6.4; 180/6.44; 180/6.48; 180/6.5; 180/6.54; 180/6.58; 180/6.6; 180/6.62; 180/6.64; 180/6.66; 180/6.7

(58) Field of Classification Search ............ 180/6.2–6.7
See application file for complete search history.

(56) References Cited

U.S. PATENT DOCUMENTS

| | | | |
|---|---|---|---|
| 4,175,628 A | 11/1979 | Cornell et al. | |
| 5,101,919 A | 4/1992 | Ossi | |
| 5,249,422 A | 10/1993 | Smith et al. | |
| 5,787,374 A | 7/1998 | Ferguson et al. | |
| 6,141,613 A | 10/2000 | Fan | |
| 6,170,584 B1 | 1/2001 | Mistry et al. | |
| 6,240,351 B1 | 5/2001 | Hou et al. | |
| 6,293,033 B1 | 9/2001 | Moriya et al. | |
| 6,421,593 B1 | 7/2002 | Kempen et al. | |
| 6,549,837 B2 | 4/2003 | Feucht et al. | |
| 6,553,290 B1 | 4/2003 | Pillar | |
| 6,702,048 B2 | 3/2004 | Schenkel et al. | |
| 6,735,889 B1 | 5/2004 | Berger et al. | |
| RE38,632 E | 10/2004 | Schmidt et al. | |
| 2004/0002794 A1 | 1/2004 | Pillar et al. | |

*Primary Examiner*—Khoi Tran
*Assistant Examiner*—Bhavesh V Amin
(74) *Attorney, Agent, or Firm*—Gowling Lafleur Henderson LLP

(57) ABSTRACT

A method and system are described for calibrating speed controls for a vehicle having a pair of drive means on opposite sides of the vehicle driven by independent speed controls and where relative speed of the drive means is used to direct the vehicle. In one aspect, angular motion of the vehicle is detected using at least one of a gyroscopic angular sensor and a pair of accelerometers to determine a rate of yaw; a speed control output for controlling the relative speed is adjusted so that the rate of yaw is lower than a threshold when speed control inputs for controlling the relative speed are equal; and one or more speed control adjustment parameters are determined and stored for use during operation for controlling the relative speed of the drive means. A microcontroller may be used to receive sensor outputs (e.g. from the gyroscope and/or accelerometers) and speed control inputs and to determine the speed control adjustment. During operation, the microcontroller may control the relative speed, applying the speed control adjustment(s) to speed control inputs.

16 Claims, 2 Drawing Sheets

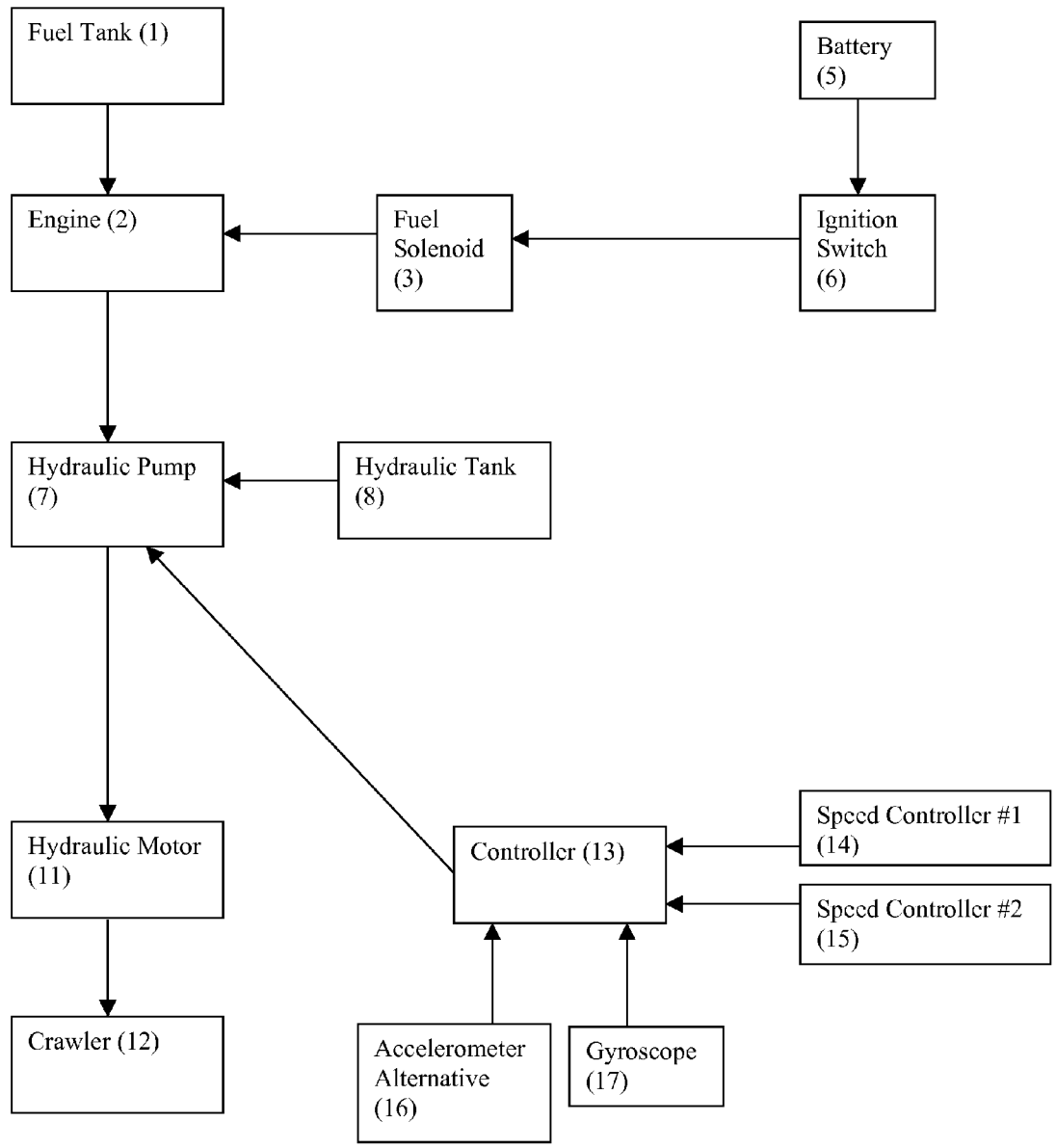
Figure 1: System Block Diagram

Figure 2: Controller Block Diagram
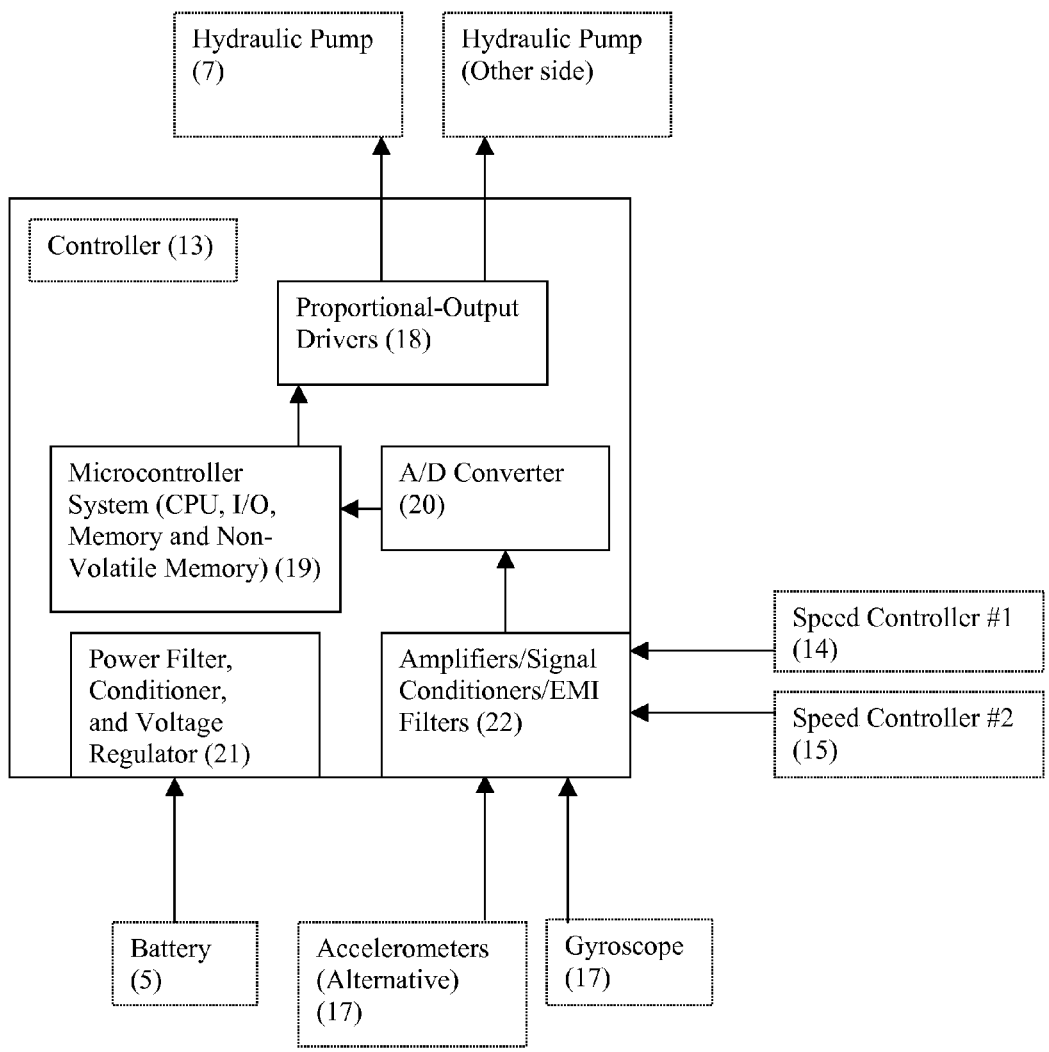

VEHICLE CALIBRATION AND TRAJECTORY CONTROL SYSTEM

CROSS-REFERENCE

The present application claims the benefit of Provisional U.S. Patent Application No. 60/774,601 filed Feb. 21, 2006.

COPYRIGHT

A portion of this specification contains material that is subject to copyright protection. The copyright owner has no objection to the facsimile reproduction by anyone of the patent document, as it appears in the Patent and Trademark Office patent file or records, but otherwise reserves all copyrights whatsoever.

FIELD

The present application relates to calibrating speed control systems for vehicles having independent and separately controlled driving means on opposing sides of the vehicles and to controlling those systems during operation.

BACKGROUND

Some vehicles, such as asphalt pavers, comprise independent driving means on opposite sides of the vehicle where the speed of each driving means is separately controlled. Each driving means often comprises a hydraulic pump for driving a motor that is coupled to a crawler or wheel(s) on one side of the vehicle. The crawler or wheel(s) are generally fixed relative to a body of the vehicle. Though the crawler or wheels are permitted to rotate forward and backward, the crawlers or wheels cannot be steered to steer the vehicle in turn. Rather, the relative speed of the two driving means is adjusted to steer the vehicle.

Such vehicles thus have speed controllers; in some cases, there is a separate speed controller—e.g. a joystick—for each side of the vehicle; in other cases, one controller determines the forward speed of the vehicle, and another determines the deviation from straight-ahead, i.e. the desired angular speed or rate of yaw. The latter may be, for example, a steering wheel or a knob. The speed commands for each side of the vehicle are derived from these controllers.

If both sides of the vehicle are not matched, (that is the actual speed on each side is equal) when the respective speed commands are at equal, the vehicle will not move straight ahead, which is a problem for the operator.

Calibration systems and procedures exist, for example for pavers, whereby the operator makes manual adjustments to speed control-system settings. These may be in the form of changes in the position of a trim-pot, or in the value of control parameters such as software control parameters. For example, the operator judges whether the calibration is adequate by fixing his gaze on a distant object, and deciding whether the vehicle is moving toward it directly—as opposed to turning, when the speed controls are set equally. Adjustments to the speed control of one side or the other may be made and the test repeated as necessary.

Such procedures have shortcomings: they are subjective, in that they depend on the operator's perception; they are not always accurate, since they depend on how meticulous the operator is in the performance of the task; and they may be iterative and time-consuming, for example when the adjustments are done by means of trim-pots they may involve adjusting one or more trim-pots and testing, then adjusting again and testing again, and so on; this makes the procedure quite inconvenient and costly, especially if the trim-pots are not easily accessible.

Therefore there is needed a method and system to facilitate calibration of both sides of the vehicle so that it will track straight when the speed commands are equal. In addition, there is needed a method and system to enable the vehicle to track straight automatically, even when the calibration is not accurate. A solution that is reliable, easy to implement, and relatively inexpensive is highly desired.

SUMMARY

A method and system are described for calibrating speed controls for a vehicle having a pair of drive means on opposite sides of the vehicle driven by independent speed commands, said independent commands being derived from one or more speed controls, and where relative speed of the drive means is used to direct the vehicle. In one aspect, angular motion of the vehicle is detected using at least one of a gyroscopic angular sensor and a pair of accelerometers to determine a rate of yaw; a speed control output for controlling the relative speed of the drive means is adjusted so that the rate of yaw is lower than a threshold when speed control inputs for controlling the relative speed are equal; and a speed control adjustment parameter is determined and stored for use during operation for controlling the relative speed of the drive means. A microcontroller may be used to receive signal inputs from at least one of the gyroscopic angular sensor and a pair of accelerometers and speed control inputs and to determine the speed control adjustment. During operation, the microcontroller may control the relative speed by applying the speed control adjustment to:

the speed control inputs applied to the machine controller; or the signal output to the drive means.

In another aspect of this invention, the movement of the vehicle straight ahead (i.e. tracking straight) is identified by the difference between the speeds of each side being about zero.

Accordingly, a vehicle operator can be provided with an objective measure of the vehicle calibration; when calibration is set properly, the vehicle rate of yaw will be about zero if the vehicle speed controllers are set equally. Furthermore, when the vehicle is tracking straight or automatically following a defined trajectory, an indicator may be activated to communicate this fact to the operator.

In addition, when one or more closed feedback control loops are enabled, the vehicle may automatically control the speed of each side, so as to:

ensure straight-ahead tracking; or steer along a defined trajectory by modifying its response to the signal from the gyroscopic angular sensor or pair of accelerometers as a function of time and/or distance traversed.

The controller outputs may be implemented as conventional analog signals or as commands sent to a data bus or data link.

BRIEF DESCRIPTION OF THE DRAWINGS

In order that the subject matter may be readily understood, embodiments are illustrated by way of examples in the accompanying drawings, in which:

FIG. 1 is a block diagram of pertinent components for driving one side of a vehicle in accordance with an embodiment of the invention; and FIG. 2 is a block diagram of a system controller in accordance with an embodiment of the invention.

DETAILED DESCRIPTION

The approach described in this document consists of three modes: calibration mode, manual mode and automatic mode.

When the vehicle operates in calibration mode, the speed adjustment parameters are obtained as described herein; when the vehicle operates in manual mode, the calibration parameters are used to modify the vehicle operation so that it will track straight-ahead in response to the speed controllers being equal while operating in an open-loop fashion; when in automatic mode the vehicle is controlled by one or more closed feedback loops so that it will either track straight-ahead or follow a desired trajectory.

The basic elements in the method and system described herein involve: detecting motion (e.g. by using a gyroscopic angular sensor or a pair of accelerometers), adjusting motion control outputs (e.g. to the respective hydraulic pump) so that the rate of yaw or the difference between the speeds of both sides is lower than a predetermined threshold, equal to about zero, when the speed commands are equal, and determining and storing adjustment parameters so that henceforth when the speed commands are equal (i.e. the difference between them is lower than another predefined threshold),

- when the vehicle operates in manual mode, the vehicle will track straight-ahead; and
- when the vehicle operates in automatic mode, it will follow the desired trajectory.

Detection of Vehicle Motion

A gyroscope may detect vehicle motion, in particular the rate of yaw or angular motion. Alternatively, two accelerometers may be employed and the speed of each side of the vehicle obtained by computing the integral of the respective accelerometer. An accelerometer is a device that outputs a voltage that is proportional to its own acceleration. Examples of suitable accelerometers for the purposes herein are Micro Electro-Mechanical Systems (MEMS), piezoelectric, shear mode, capacitive spring mass based and Surface Acoustic Wave (SAW) accelerometers.

A gyroscope or a pair of accelerometers may be mounted in a location removed from the traction means of the machine or vehicle, and as such are easier to retrofit and more reliable than, and preferable to, other sensor types such as Hall-effect sensors, magnetic pick-up sensors, potentiometers and resolvers. The latter are located such that they are physically coupled to the traction or propulsion means, and are exposed to the weather and road hazards, such as rocks and salt spray; this also necessitates wires to be routed to such exposed locations, which makes them vulnerable to damage and the installation more laborious, potentially requiring disassembling or modifying part of the machine or the propulsion means. Alternatively, the latter sensors and wires may be protected from these hazards by heavy-duty enclosures or coupling means, which increases the cost of the installation. A gyroscope or a pair of accelerometers can be located in a protected part of the machine or vehicle, which makes the installation more reliable, easier to implement, and less costly.

Desired Angular Speed

The desired angular speed of the vehicle, which is used in the control mode described below, may be derived as follows. If the vehicle has one speed control, e.g. a joystick, and one steering control, e.g. a steering wheel, the desired angular speed may be obtained from the output of the steering wheel. If the vehicle has two speed controls, one for each side, e.g. two joysticks, the desired angular speed may be obtained from the difference between the outputs of the two.

Mode of Operation Selection

The operator may select the vehicle mode of operation, for example, by setting the position of a three-position switch, namely to manual, calibration and automatic. In a different implementation, the mode may be set by means of a Human-Machine Interface (HMI) connected to the system controller. In yet another implementation, calibration mode may be entered by holding down a number of operational switches while power to the system controller is turned on and for a predetermined period of time thereafter, e.g. 15 seconds, and automatic mode may be entered by holding down a different set of switches while power to the system controller is turned on and for a predetermined period of time thereafter, e.g. 15 seconds.

A given mode of operation may be exited similarly by changing the position of a three-position switch, by means of a HMI connected to the system controller, or by cycling power to the system. Manual mode would typically be the default mode of operation.

Modes of Operation: Calibration Mode

In calibration mode, the operator manually orients the vehicle in a direction where ample space is available for travel in a straight line. The operator then sets to a desired position:
- the speed controller, if the vehicle has independent speed and steering controllers;
- both speed controllers, if the vehicle has independent speed controllers for each side.

The system then determines the value of the deadband of each drive means, by gradually increasing the signal to it either directly or by increasing the value of the respective input to the system, until the onset of motion is detected. The deadband output equals the maximum signal that does not cause the vehicle to move, less a predefined error margin, e.g. 3%.

After the deadband is known for each drive means, the system increases the signal to it either directly or by increasing the value of the respective input to the system, to a predetermined fraction of the maximum signal. The system then adjusts the output of one side, e.g. the one that is traveling faster, until both sides travel at the same speed or until the vehicle's rate of yaw is smaller than a predetermined threshold. The system then calculates the percentage adjustment required while taking into account only the portion of the signal to the drive means in excess of the deadband and stores the result in non-volatile memory.

The method above may be augmented by the system taking a number of measurements and then averaging them. For example, 50% of the maximum signal to the drive means may be used, and a correction factor obtained; then 70% may be used, and another factor obtained; then 90% may be used, and another factor obtained. This incremental method has the advantage of averaging results and also avoiding surprising machine behavior in the event the drive means are badly mismatched.

If the system determines that the correction factor is larger than a predetermined threshold, e.g. 25%, which may indicate a serious mechanical, hydraulic or electrical problem on the vehicle, the calibration may be aborted.

Modes of Operation: Manual Mode

During operation in manual mode, whenever a speed command is received it is prorated in accordance with the adjustment value(s) stored in memory, so that when the speed commands are equal the vehicle will track straight. In order to avoid discontinuities in the output, the same adjustment is used even when the speed commands are not equal.

Modes of Operation: Automatic Mode

In Automatic Mode the system controller adjusts the outputs to the hydraulic pumps continuously, based on the value of the desired angular speed and the calculated actual angular speed derived from the sensors installed in the vehicle, so as to achieve the desired angular speed in order to follow a defined trajectory (e.g. defined or determined as a function of time or distance traveled which may be straight-ahead or not). Said trajectory may be provided to the controller, e.g. be downloaded to the controller by means of a data bus or data link.

Exemplary Embodiment

In accordance with an exemplary embodiment of the invention, the controller comprises a micro-controller based system, an A/D converter, signal conditioners, a voltage regulator and power drivers. The sensor used to detect vehicle motion is a solid-state gyroscope. The controller reads the commands generated by the joysticks that control the vehicle.

During calibration, the micro-controller reads the rate of yaw of the vehicle using the gyroscope. If an angular velocity with a magnitude greater than a preset threshold, e.g. ±0.1°/sec, is detected, then the controller adjusts the output to one side of the vehicle gradually until the rate of yaw falls below said threshold. Once this is achieved, the value of the output adjustment is stored in non-volatile memory. This step may be repeated in order to obtain more results to be averaged.

In the automatic mode of operation, the micro-controller utilizes the sensor(s), e.g. reads the rate of yaw of the vehicle using the gyroscope, and determines the desired vehicle motion (e.g. rate of yaw) from the defined trajectory (function of time and/or distance traveled), as well as from the speed commands—e.g. derived from the two joysticks—which determine the rate of forward speed of the vehicle. The controller then uses, for example, a PID closed-loop feedback control algorithm, to control the vehicle's motion (e.g. rate of yaw): an error signal is generated by subtracting the actual rate of yaw from the desired rate of yaw; a PID operator is then applied to the error.

FIG. 1 is a block diagram illustrating pertinent drive and control components for one side of a vehicle in accordance with the exemplary embodiment. Pump, motor and crawler components for an opposite side are not shown. The same applies to a pair of accelerometers if such are used as alternatives to a gyroscope.

In the vehicle described, the engine (2) draws fuel from a fuel tank (1); this action is controlled by a fuel solenoid (3), which must be energized to enable fuel to flow to the engine. A battery (5), through an ignition switch (6), typically provides power to a fuel solenoid (3). The engine (2) drives a hydraulic pump (7); a controller (13) sends an output signal to the pump (7), which determines the rate of output flow, which in turn drives a hydraulic motor (11). Motor (11) drives one of the crawlers (12) that propel the vehicle. By varying the output signal to hydraulic pump (7), controller (13) changes the speed of that side of the vehicle. Controller (13) receives input signals from speed controllers #1 and #2 (14 and 15) and angular sensor signals from a gyroscope (17) for use in calibration operations of controller (13). Controller (13) may receive signals from an accelerometer pair (16) for use in the calibration operations. It is understood that additional calculations maybe required if an accelerometer pair is used to determine the rate of yaw. The pair of accelerometers may be placed, for instance, one on each side of the machine or they may be placed in any known locations such that their projections on a plane parallel to a plane of motion of the machine do not overlap.

FIG. 2 illustrates an example controller (13) in greater detail. Within the controller (13), signals from gyroscope (17) or, alternatively, accelerometers (16) if used instead, are modified by amplifiers/signal conditioners/EMI filters (22), so that the signals are suitable to be read by the A/D converter (20). The signals from the speed controllers (14 and 15) are similarly modified, except that they will typically require attenuation rather than amplification.

In calibration mode, a micro-controller system (19) reads the A/D converter (20), executes the calibration operations (described further below) and sets accordingly the proportional outputs that control the hydraulic pumps (7). These outputs will typically be high-side drivers, with PWM capability, and an output rating in excess of 1.5 A. When calibration is complete, micro-controller system (19) stores the resulting speed adjustment values in its non-volatile memory.

In automatic mode, micro-controller system (19) reads the A/D converter (20), executes the control operations (described further below), and sets accordingly the proportional outputs that control the hydraulic pumps (7).

The following describes an example of a software program, using pseudo-code to set out operations, which may be executed by controller (13) (i.e. micro-controller system (19)). In the pseudo-code, reference is made to an alarm and shutdown indicators. These are optional devices, which may be used to inform the operator of the reason for the vehicle having stopped in the event the discrepancy between both sides of the machine is deemed too large and calibration mode is interrupted, as described above.

Calibration Mode Operations

One manner of calibrating is described in further detail in pseudo-code below.

Note:
   a. By definition, increasing the speed of the adjusted side increases the angular speed (i.e., it makes it more positive).
   b. threshold_1>0.
   c. The speed command is assumed to be linear, i.e. the actual current output to the valve is a function of the speed command plus a deadband value that is added to it and places the pump at the verge of issuing an output flow. Deadband determination operations are further described below.

```
Start Calibration
  De-activate outputs
  Initialize
  If gyroscope installed
    Read vehicle angular speed
    error signal = angular speed
  Else    /*assumes accelerometers are installed */
    Read acceleration on both sides
    Determine speed, integrating using acceleration for both sides
    error signal = difference between speeds
  Read speed controllers
  Get coefficient
  If desired speed is forward then
    If not system fault
      forward motion coefficient = coefficient
      store forward motion coefficient
```

```
                                    -continued

Else
    If not system fault
        rear motion coefficient = coefficient
        store rear motion coefficient
    If system fault
        Indicate calibration aborted
End Calibration
Start Get Coefficient
    system fault = not
    If (error signal > threshold_1)
        Until (error signal < threshold_1 or system fault)
            Decrement adjustment coefficient
            If adjustment coefficient <= 0 then
                system fault = yes
                For both sides
                    speed command = 0
            Else
                speed command = initial command * adjustment coefficient
                wait N seconds for machine speed to settle
    Else if (error signal < -threshold_1)
        Until (error signal > -threshold_1 or system fault)
            Increment adjustment coefficient
            If adjustment coefficient > maximum allowable then
                system fault = yes
                For both sides
                    speed command = 0
            Else
                speed command = initial command * adjustment coefficient
                wait N seconds for machine speed to settle
    If(|error signal| < threshold_1 and not system fault) then
        Return adjustment coefficient
    Else
        Return adjustment coefficient = 0
    Return system fault
End Get Coefficient
```

Deadband Determination Operations

The following pseudo-code describes operations to determine a vehicle deadband in the forward direction. A similar approach applies to detecting the deadband in the rear direction, varying the variables' signs appropriately.

```
Start Deadband Detection
epsilon = 3% of output full scale            /* 3% is an example*/
Zero speed commands
Until angular speed>threshold_2
    Increment output to pump driving side 1
    If output to side 1 pump > maximum allowable   /* maximum allowable
                                                     is e.g. 30% of output
                                                     full scale*/
        Abort Deadband Detection
        Set deadband fault indicator
    Else
        side 1 deadband = current output to side 1 pump – epsilon
        Store side 1 deadband
Zero output to side 1 pump
Until angular speed<-threshold_2
    Increment output to pump driven side 2
    If output to side 2 pump > maximum allowable   /* maximum allowable
                                                     is e.g. 30% of output
                                                     full scale*/
        Abort Deadband Detection
        Set deadband fault indicator
    Else
        side 2 deadband = current output to side 2 pump – epsilon
        Store side 2 deadband
Zero output to side 2 pump
End deadband detection
```

Automatic Mode Operations

The following pseudo-code example describes operations for controlling relative speed during normal driving operations.

```
Start Automatic Control Loop
Read vehicle angular speed
Read speed controllers
Obtain defined trajectory (e.g. function of time and/or distance traveled)
Compute desired angular speed
Outputs = PID[current angular speed – desired angular speed]
End Automatic Control Loop
```

Though not shown in the Figures, an alternative manner of calibrating may be used providing the operator with more of a role. The operator may enter a calibration mode, and adjust the speed control inputs to drive the vehicle. The controller may determine the actual angular speed or respective speeds of the drive means, as discussed, and as the operator adjusts the relative speeds, determine when the vehicle is actually tracking straight. The controller then outputs a signal to indicate that the machine is going straight. Once the operator set the speeds so that the machine tracks straight, the controller determines and stores the at least one speed adjustments—either automatically, or under operator control, when the operator presses a button such as in response to a signal indicating that the machine is tracking straight.

The above-described embodiments are intended to be examples only. Those of skill in the art may effect alterations, modifications and variations to the particular embodiments without departing from the scope of the application. The subject matter described herein in the recited claims intends to cover and embrace all suitable changes in technology.

I claim:

1. A method of calibrating speed controls for a vehicle having a pair of drive means on opposite sides of the vehicle driven by independent speed controls and where relative speed of the drive means is used to direct the vehicle, the method comprising:
   detecting angular motion of the vehicle using one of a gyroscopic angular sensor and a pair of accelerometers to determine a rate of yaw;
   adjusting a speed control output for controlling relative speed so that the rate of yaw is lower than a threshold when speed control inputs for controlling the relative speed are equal; and
   determining and storing at least one speed control adjustment for use during operation for controlling the relative speed of the drive means.

2. The method according to claim 1 comprising the step of determining automatically the deadband of each drive means.

3. The method according to claim 1 comprising the step of controlling the speed of the drive means using the at least one speed control adjustment.

4. The method according to claim 3 wherein when the speed control inputs are equal, the at least one speed control adjustment is applied so that the vehicle automatically tracks straight.

5. The method according to claim 3 comprising receiving a trajectory for defining a direction for the vehicle and automatically controlling an angular speed of the vehicle in response to the trajectory.

6. The method according to claim 1 comprising:
   activating a calibration mode to perform the steps of detecting, adjusting and determining and storing; and
   deactivating the calibration mode when completed.

7. A system for calibrating speed controls for a vehicle having a pair of drive means on opposite sides of the vehicle driven by independent speed controls and where relative speed of the drive means is used to direct the vehicle, the system comprising:

at least one of a gyroscopic angular sensor and a pair of accelerometers outputting signals for determining angular motion of the vehicle;

a controller configured to receive speed control inputs for each drive means and the signals for determining angular motion to determine the rate of yaw and to send speed control outputs to control the speed of each drive means, said controller further configured to:

adjust a speed control output for controlling relative speed so that the rate of yaw is lower than a threshold when speed control inputs received for controlling the relative speed are equal; and determine and store at least one speed control adjustment for use during operation for controlling the relative speed of the drive means.

8. The system according to claim 7 wherein the controller is configured to determine a deadband of each drive means.

9. The system according to claim 7 wherein the controller is configured to control the speed of the drive means using the at least one speed control adjustment.

10. The system according to claim 9 wherein said controller is configured to adjust said speed control inputs received using said at least one speed control adjustment and output the adjusted speed control inputs to a drive means controller for driving the vehicle.

11. The system claim according to claim 7 wherein the controller is configured to receive a trajectory for defining a direction of the machine and further configured to steer the vehicle along the trajectory, modifying its response to the sensor signals as a function of one or more of time and distance traversed.

12. A computer program product storing instructions and data for configuring a controller to execute operations to:

detect angular motion of the vehicle using one at least one of a gyroscopic angular sensor and a pair of accelerometers to determine a rate of yaw;

adjust a speed control output for controlling relative speed so that the rate of yaw is lower than a threshold when speed control inputs for controlling the relative speed are equal; and determine and store at least one speed control adjustment for use during operation for controlling the relative speed of the drive means.

13. A method of calibrating speed controls for a vehicle having a pair of drive means on opposite sides of the vehicle driven by independent speed controls and where relative speed of the drive means is used to direct the vehicle, the method comprising:

detecting angular motion of the vehicle using at least one of a gyroscope and a pair of accelerometers;

receiving speed control inputs for controlling relative speed, the speed control inputs adjusted by an operator so that the angular motion is lower than a threshold defining when the vehicle is tracking straight; and determining and storing at least one speed control adjustment for use during operation for controlling the relative speed of the drive means such that when speed control inputs for controlling the relative speed are equal, the vehicle tracks straight.

14. The method according to claim 13 comprising indicating when the vehicle is tracking straight.

15. The method according to claim 13 wherein the method steps are performed during a calibration mode and said step of determining and storing is performed according to one of:

(i) automatically when the vehicle is tracking straight; and (ii) upon operator direction when the vehicle is tracking straight.

16. A system for calibrating speed controls for a vehicle having a pair of drive means on opposite sides of the vehicle driven by independent speed controls and where relative speed of the drive means is used to direct the vehicle, the system comprising:

at least one of a gyroscopic angular sensor and a pair of accelerometers outputting signals for determining angular motion of the vehicle;

a controller configured to receive speed control inputs for each drive means and the signals for determining angular motion to determine the rate of yaw and to send speed control outputs to control the speed of each drive means, said controller further configured to:

detect angular motion of the vehicle using the output signals;

receive the speed control inputs for controlling relative speed where the speed control inputs are adjusted by an operator so that the angular motion is lower than a threshold defining when the vehicle is tracking straight; and determine and store at least one speed control adjustment for use during operation for controlling the relative speed of the drive means such that when speed control inputs for controlling the relative speed are equal, the vehicle tracks straight.

\* \* \* \* \*